(12) United States Patent
Yang et al.

(10) Patent No.: US 9,296,362 B2
(45) Date of Patent: Mar. 29, 2016

(54) WINDSHIELD WIPER WITH EVEN PRESSING FORCE

(71) Applicant: Danyang UPC Auto Parts Co., Ltd., Danyang (CN)

(72) Inventors: Chih-Ming Yang, Danyang (CN); Chuan-Chih Chang, Danyang (CN)

(73) Assignee: DANYANG UPC AUTO PARTS CO., LTD., Jiangsu (CN)

( * ) Notice: Subject to any disclaimer, the term of this patent is extended or adjusted under 35 U.S.C. 154(b) by 0 days.

(21) Appl. No.: 14/569,777

(22) Filed: Dec. 14, 2014

(65) Prior Publication Data

US 2015/0096141 A1   Apr. 9, 2015

Related U.S. Application Data

(63) Continuation-in-part of application No. 13/282,391, filed on Oct. 26, 2011, now Pat. No. 9,009,910.

(51) Int. Cl.
*B60S 1/38* (2006.01)

(52) U.S. Cl.
CPC .............. *B60S 1/3801* (2013.01); *B60S 1/3806* (2013.01); *B60S 2001/3815* (2013.01)

(58) Field of Classification Search
CPC .. B60S 1/38; B60S 1/3801; B60S 2001/3813; B60S 2001/3815

USPC ............................ 15/250.46, 250.44, 250.361
See application file for complete search history.

(56) References Cited

U.S. PATENT DOCUMENTS

| 2009/0158547 A1* | 6/2009 | Kim ....................... B60S 1/3848 15/250.351 |
| 2013/0227810 A1* | 9/2013 | Tolentino .............. B60S 1/4003 15/250.32 |

* cited by examiner

*Primary Examiner* — Gary Graham
(74) *Attorney, Agent, or Firm* — Chun-Ming Shih; HDLS IPR Services (57) ABSTRACT

A windshield wiper (1,1*a*) with an even pressing force is connected to a driving arm (2) and includes a primary wiper frame (10,10*a*), two auxiliary wiper frames (20,20*a*), connecting frames (30,30*a*), and a wiper blade (40,40*a*). The primary wiper frame (10,10*a*) includes a fixing base (11,11*a*) connected to the driving arm (2). The auxiliary wiper frames (20,20*a*) are disposed on both ends of the primary wiper frame (10,10*a*). Each auxiliary wiper frame (20,20*a*) includes an elastic piece (21,21*a*) and a pivotal base (22,22*a*) fixed to the elastic piece (21,21*a*) and pivotally connected to the primary wiper frame (10,10*a*). The connecting frames (30,30*a*) are evenly provided on each auxiliary wiper frame (20). Each connecting frame (30) includes a pressing piece (31,31*a*) and buckling brackets (32,32*a*). The wiper blade (40,40*a*) is disposed through the buckling brackets (32,32*a*) to be connected below the pressing piece (31,31*a*).

11 Claims, 12 Drawing Sheets

WINDSHIELD WIPER WITH EVEN PRESSING FORCE

BACKGROUND OF THE INVENTION

1. Field of the Invention

This application is a continuation-in-part of U.S. patent application Ser. No. 13/282,391, filed Oct. 26, 2011, and titled "WINDSHIELD WIPER WITH EVEN PRESSING FORCE". The entire disclosures of the above application are all incorporated herein by reference.

2. Description of Prior Art

Automotive windshield wiper is mounted on an outer surface of a windshield of a car. The windshield wiper is connected to a driving arm. The driving arm drives the windshield wiper to swing on the windshield.

The windshield wiper is used to wipe out rains, fogs or sludge on the windshield, so that the driver can have a good vision and an enhanced safety in driving. Thus, preferably, the windshield wiper is brought into compact contact with the outer surface of the windshield in such a manner that the windshield wiper exerts an even pressing force thereon. In this way, a wiper blade of the windshield wiper can be brought into compact contact with the windshield to wipe out the rains on the windshield completely.

In view of the above, the present inventor proposes a novel and reasonable structure on his expert knowledge and deliberate researches.

SUMMARY OF THE INVENTION

The present invention is to provide a windshield wiper with an even pressing force. The elastic pressing force of the windshield wiper is increased and evenly applied onto a windshield of a car, so that a wiper blade of the windshield can be brought into compact contact with the windshield.

The present invention is to provide a windshield wiper with an even pressing force, which is connected to a driving arm and includes a primary wiper frame, a pair of auxiliary wiper frames, a plurality of connecting frames, and a wiper blade. The primary wiper frame comprises a fixing base connected to the driving arm. The pair of auxiliary wiper frames is disposed on both ends of the primary wiper frame respectively. Each of the auxiliary wiper frames comprises an elastic piece and a pivotal base fixed to the elastic piece. The pivotal base is pivotally connected to the primary wiper frame. The connecting frames are evenly provided on each of the auxiliary wiper frames. Each of the connecting frames comprises a pressing piece and a plurality of buckling brackets provided on the pressing piece. The wiper blade is disposed through the buckling brackets to be connected below the pressing piece.

In comparison with prior art, the present invention has advantageous features as follows. A pair of auxiliary wiper frames is disposed on both ends of the primary wiper frame. A plurality of connecting frames is evenly disposed on each of the auxiliary wiper frames. Finally, the wiper blade is connected to the connecting frame. By this arrangement, when the driving arm drives the primary wiper frame to swing and exerts a pressing force on the primary wiper frame, the connecting frame evens the pressing force on the wiper blade. Further, the elastic force of the pair of auxiliary wiper frames and the connecting frames makes the wiper blade to be brought into compact contact with the windshield, thereby generating an excellent wiping effect.

DETAILED DESCRIPTION OF THE INVENTION

The detailed description and technical contents of the present invention will become apparent with the following detailed description accompanied with related drawings. It is noteworthy to point out that the drawings is provided for the illustration purpose only, but not intended for limiting the scope of the present invention.

Figure 1:
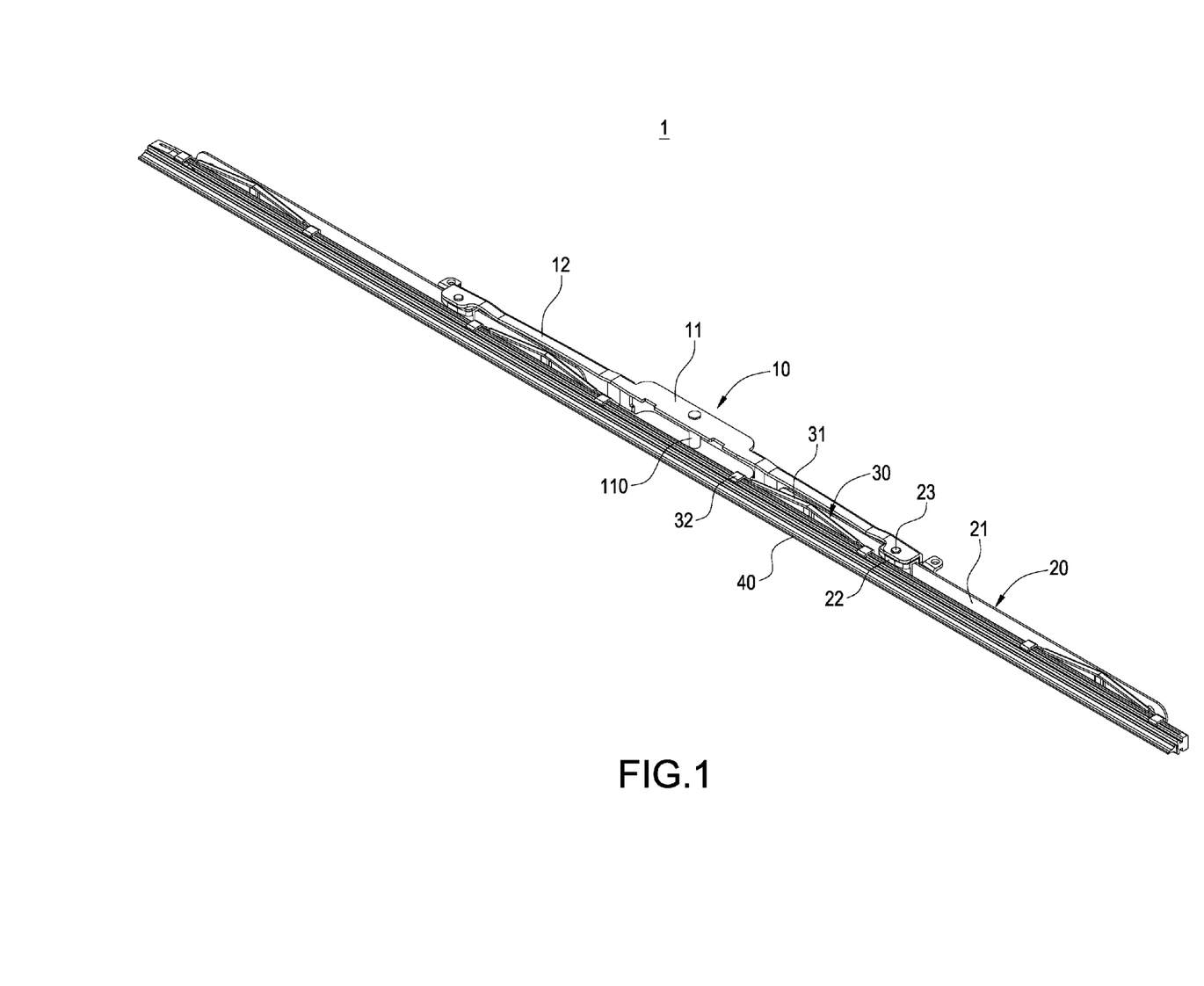
FIG. 1 is a perspective view showing the external appearance of the windshield wiper of the present invention.
Figure 2:
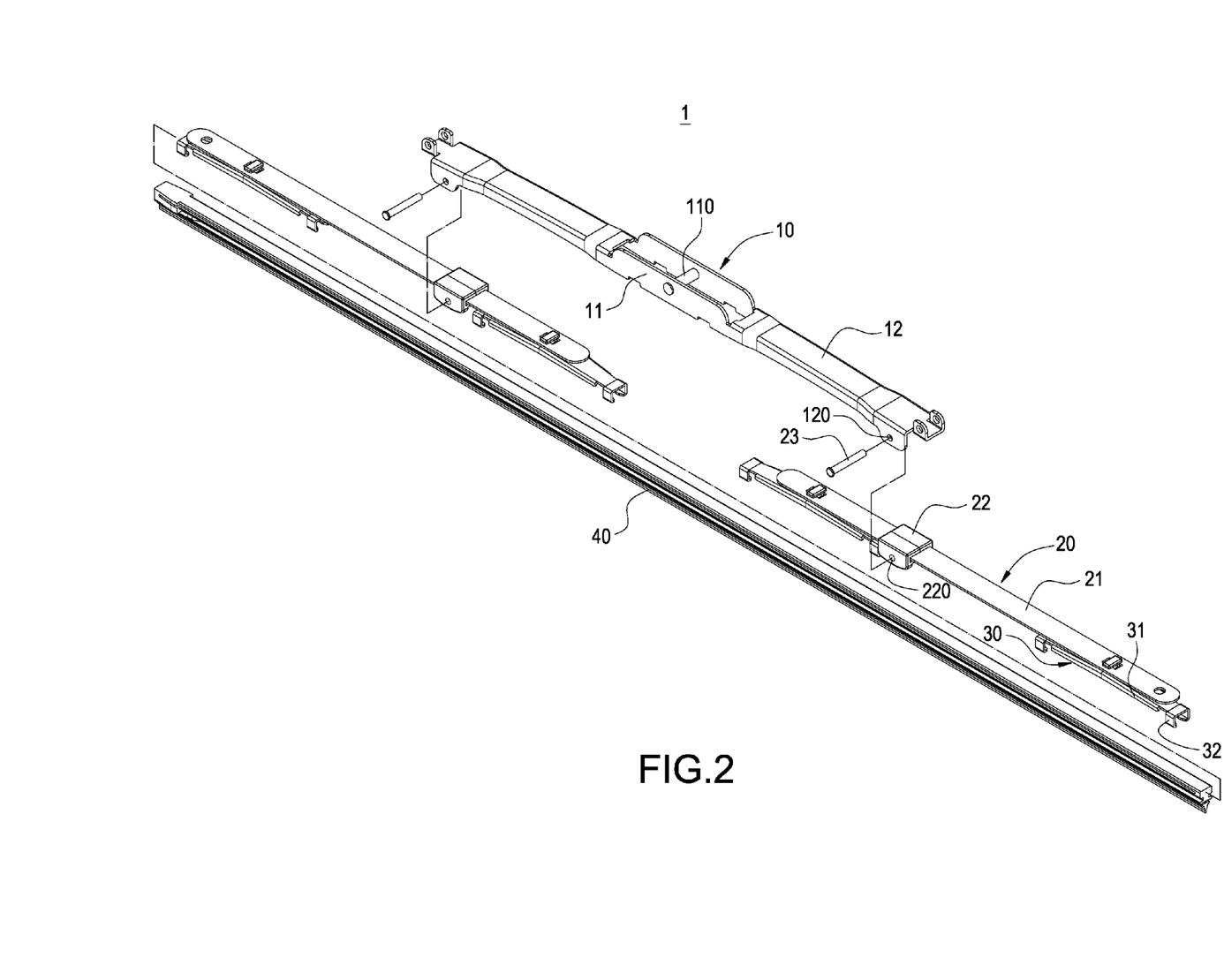
FIG. 2 is an exploded perspective view showing the windshield wiper of the present invention.

Please refer to FIG. 1 and FIG. 2. FIG. 1 is a perspective view showing the external appearance of the windshield wiper of the present invention, and FIG. 2 is an exploded perspective view showing the windshield wiper of the present invention. The present invention provides a windshield wiper with an even pressing force, which includes a primary wiper frame 10, a pair of auxiliary wiper frames 20, a plurality of connecting frames 30, and a wiper blade 40.

The primary wiper frame 10 comprises a fixing base 11. The fixing base 11 has a pivotal shaft 110. In the present embodiment, the primary wiper frame 10 further includes a set of fixing arms 12 connected to both sides of the fixing base 11. Each fixing arm 12 is provided with a first pivotal hole 120.

The pair of auxiliary wiper frames 20 is provided on both ends of the primary wiper frame 10, respectively. Each of the auxiliary wiper frames 20 comprises an elastic piece 21, a pivotal base 22 fixed to the elastic piece 21, and a set of rods 23. The elastic piece 21 is made by metallic materials and has elasticity for deformation. The pivotal base 22 is pivotally connected to the primary wiper frame 10. In the present embodiment, the pivotal base 22 is connected to the fixing arm 12. Each rod 23 is disposed through the pivotal base 22 and the fixing arm 12, so that the pair of auxiliary wiper frames 20 can be connected to the fixing arms 12. In the present embodiment, the pivotal base 22 is provided with a second pivotal hole 220 corresponding to the first pivotal hole 120. The rod 23 is disposed through the first pivotal hole 120 and the second pivotal hole 220, thereby connecting the pair of auxiliary wiper frames 20 to the fixing arms 12.

The connecting frames 30 are evenly disposed on each auxiliary wiper frame 20. Each of the auxiliary wiper frames 20 is provided with the same number of connecting frames 30. In the present embodiment, each of the auxiliary wiper frames 20 is provided with two connecting frames 30 (not limited thereto). The two connecting frames 30 are provided on both ends of the auxiliary wiper frame 20 respectively. Each of the connecting frames 30 comprises a pressing piece 31 and a plurality of buckling brackets 32 provided on the pressing piece 31. The wiper blade 40 is made of rubber. The wiper blade 40 is disposed through the buckling brackets 32 and connected below the pressing pieces 31.

Figure 3:
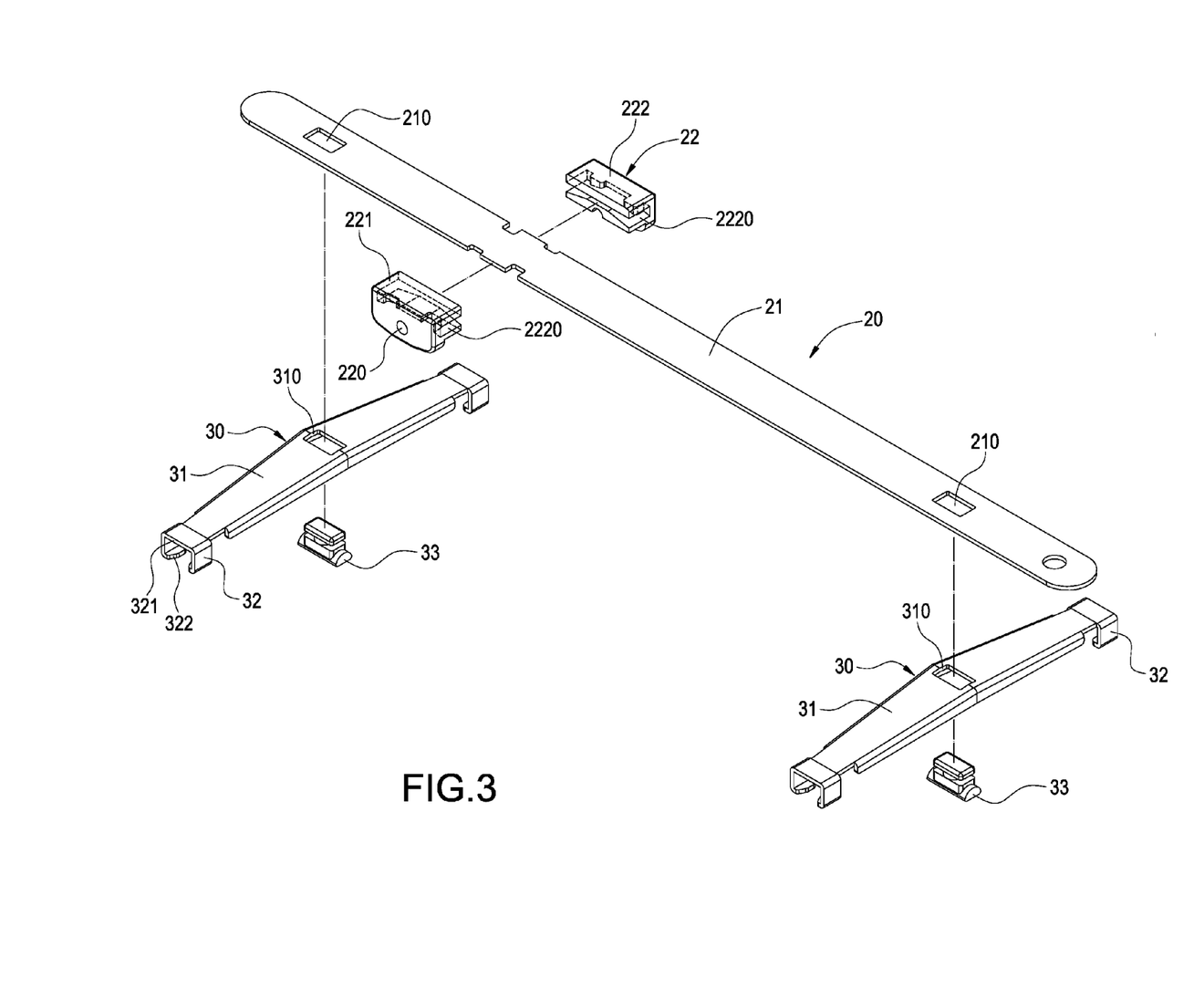
FIG. 3 is an exploded perspective view showing the auxiliary wiper frames and the connecting frames of the present invention.
Figure 4:
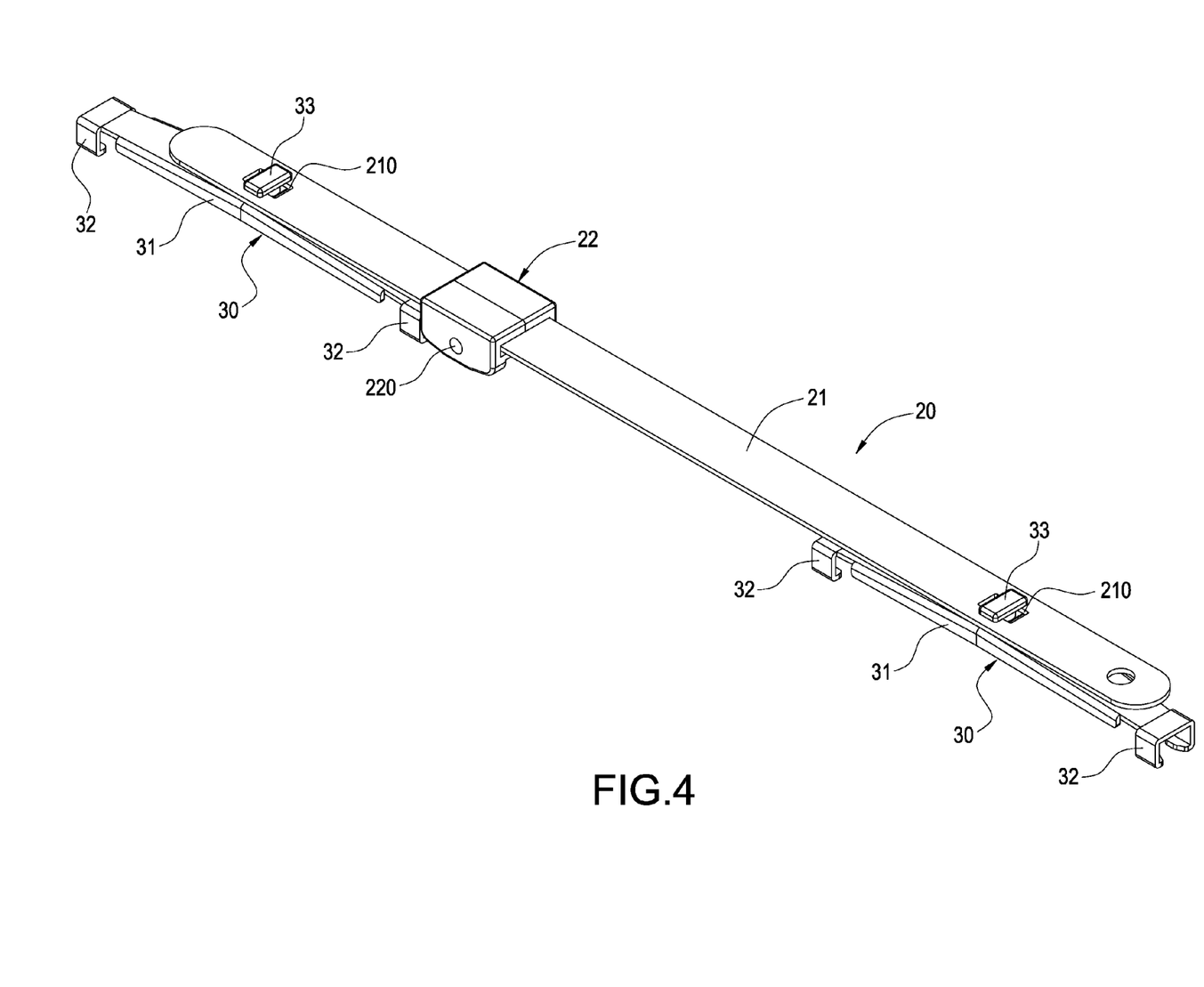
FIG. 4 is a perspective view showing the external appearance when the auxiliary wiper frames and the connecting frames of the present invention are assembled together.
Figure 5:
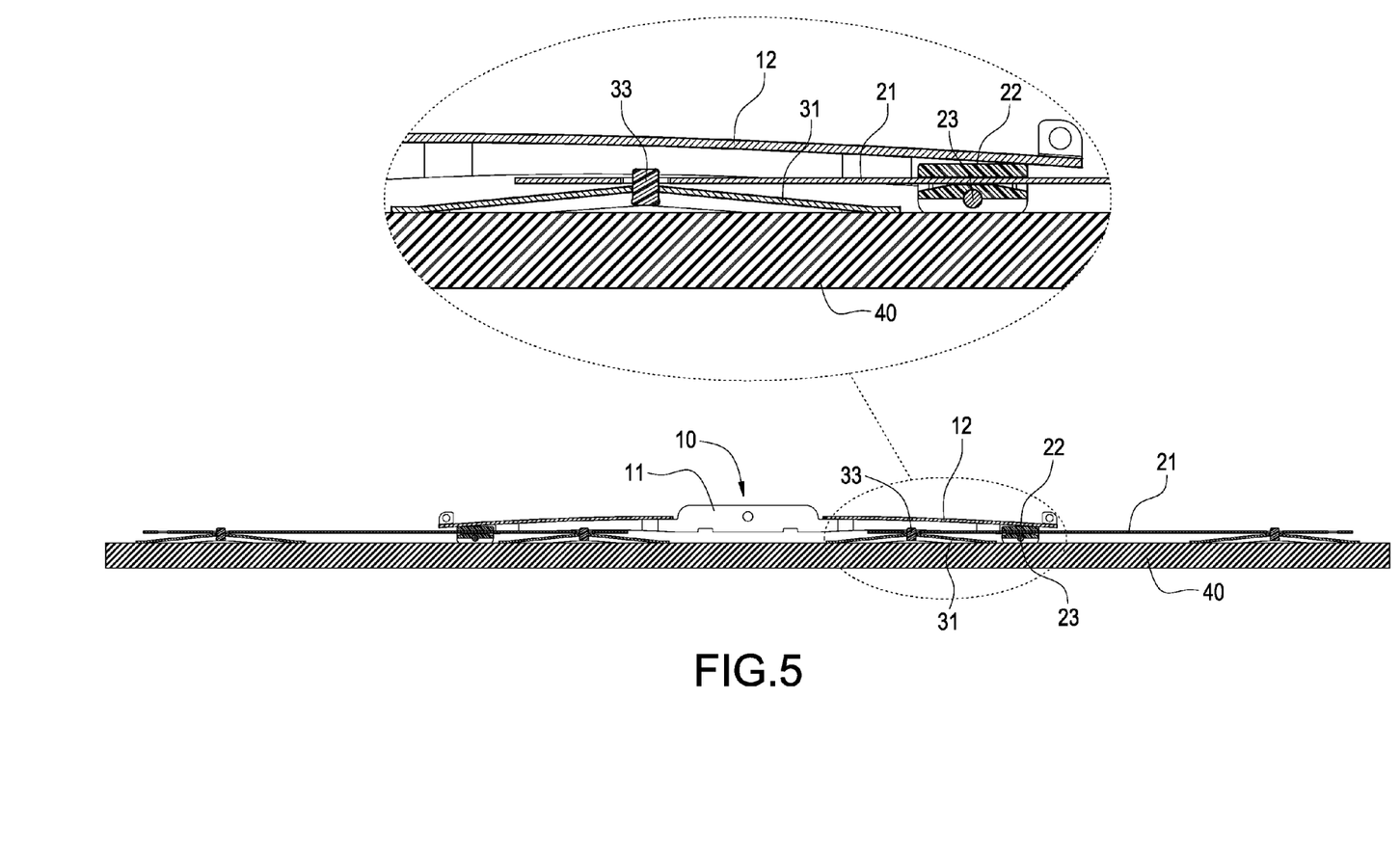
FIG. 5 is an assembled cross-sectional view showing the windshield wiper of the present invention.
Figure 6:
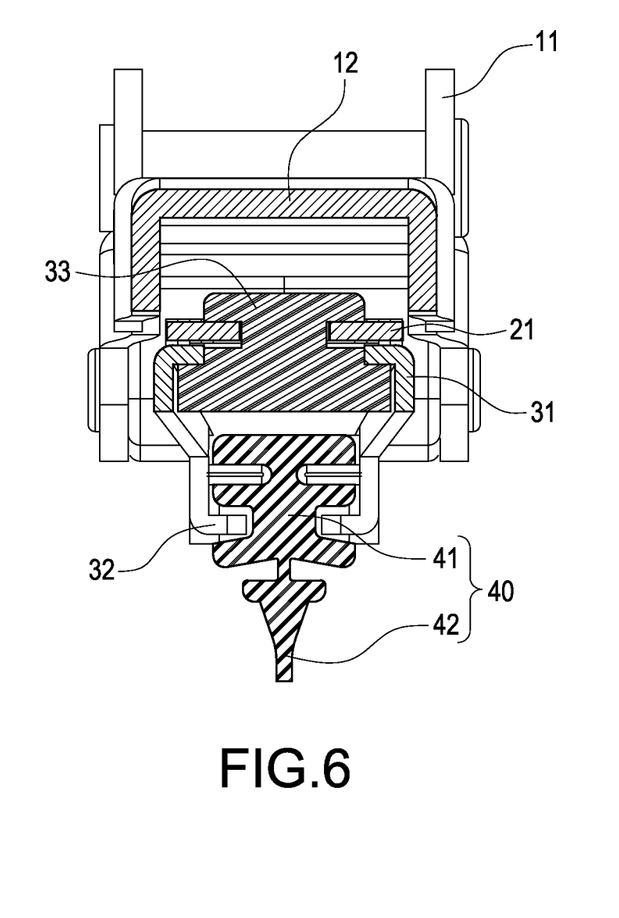
FIG. 6 is another assembled cross-sectional view showing the windshield wiper of the present invention.

Please refer to FIGS. 3 to 6. FIG. 3 is an exploded perspective view showing the auxiliary wiper frames and the connecting frames of the present invention. FIG. 4 is a perspective view showing the external appearance when the auxiliary wiper frames and the connecting frames of the present invention are assembled together. FIG. 5 is an assembled cross-sectional view showing the windshield wiper of the present invention. FIG. 6 is another assembled cross-sectional view showing the windshield wiper of the present invention. The pivotal base 22 of the auxiliary wiper frame 20 comprises a first connecting base 221 and a second connecting base 222 connected to both sides of the elastic piece 21. The first connecting base 221 and the second connecting base 222 are provided with a second pivotal hole 220 respectively for allowing the rod 23 to pass through. The first connecting base 221 is provided with a first through-hole 2210, and the second connecting base 222 is provided with a second trough 2220. The first connecting base 221 and the second connecting base 222 are positioned on both sides of the elastic piece 21 by means of the first through-hole 2210 and the second through-hole 2220. Then, the rod 23 is disposed into the second pivotal hole 220, so that the pivotal base 22 can be pivotally connected to the bottom surface of the fixing arm 12.

The assembly of the connecting frame 30 will be described more specifically as follows. The pressing piece 31 is formed into an arc shape, so that the middle portion of the pressing piece 31 is positioned at a level higher that of both sides of the pressing piece 31. The buckling bracket 32 comprises a U-shaped frame 321 and a set of restricting pieces 322 formed inside the U-shaped frame 321. The wiper blade 40 is slidingly connected to the inside of the restricting piece 322. The wiper blade 40 comprises a fixing section 41 and a wiping section 42 connected to the fixing section 41. The fixing section 41 is disposed through the U-shaped frame 321 along the restricting pieces 322. The wiping piece 42 is exposed to the outside of the U-shaped frame 321, thereby connecting the wiping blade 40 to the connecting frames 30.

Further, the connecting frame 30 comprises a plurality of positioning blocks 33. The elastic piece 21 is provided with a plurality of first troughs 210. Each of the pressing pieces 31 is provided with a second trough 310. The positioning block 33 is disposed through the second trough 310 to abut in the first trough 210, thereby fixing the connecting frame 30 to the bottom surface of the elastic piece 21.

Figure 7:
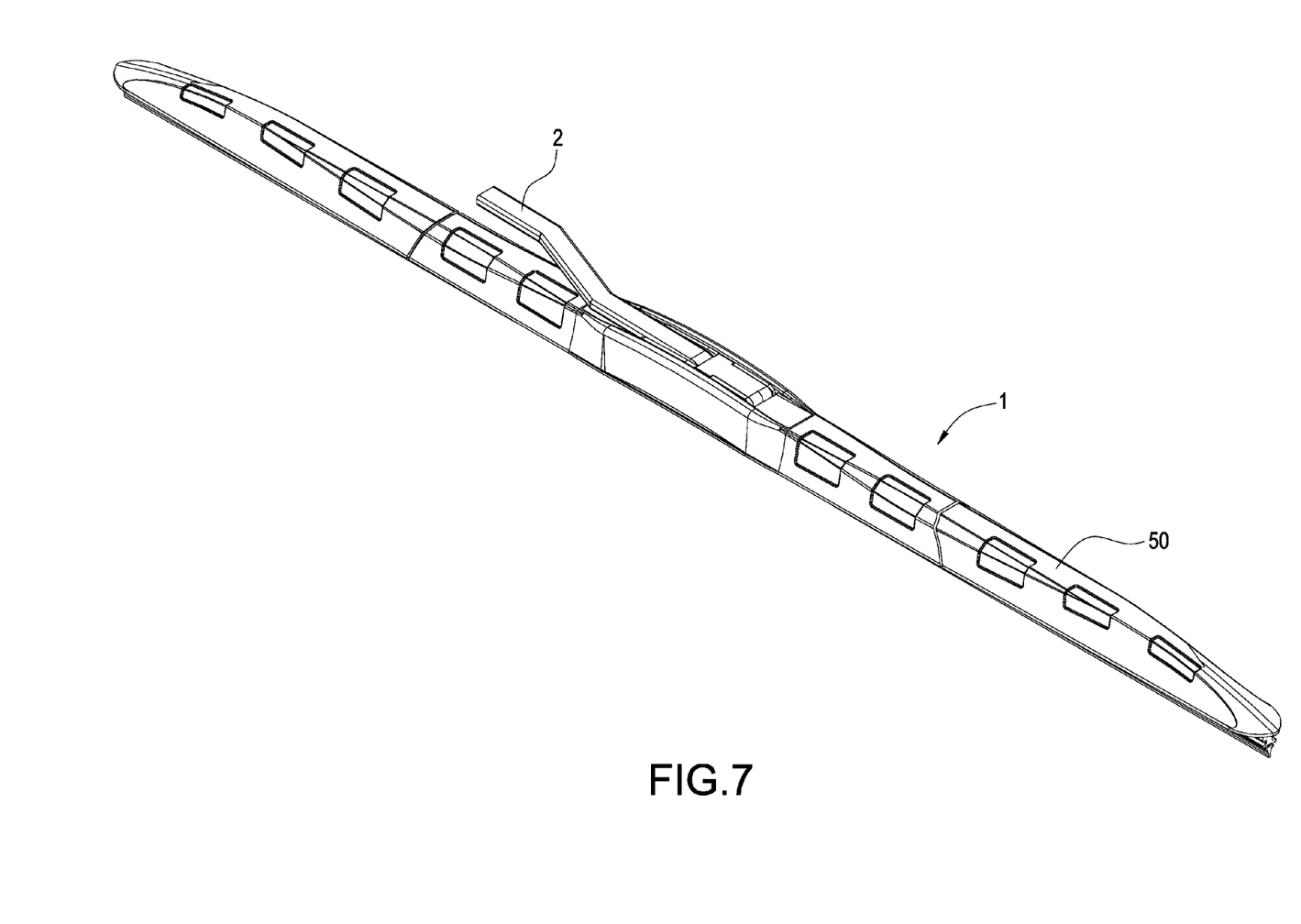
FIG. 7 is a schematic view showing the application of the windshield wiper of the present invention.

Please refer to FIG. 7, which is a schematic view showing the application of the windshield wiper of the present invention. The wiper blade 1 is connected to a driving arm 2. The driving arm 2 is fixed to the pivotal shaft 110 of the primary wiper frame 10, so that the driving arm 2 can drive the windshield wiper 1. Further, a protective sheath 50 is put outside the windshield wiper 1 for protection purpose.

Figure 8:
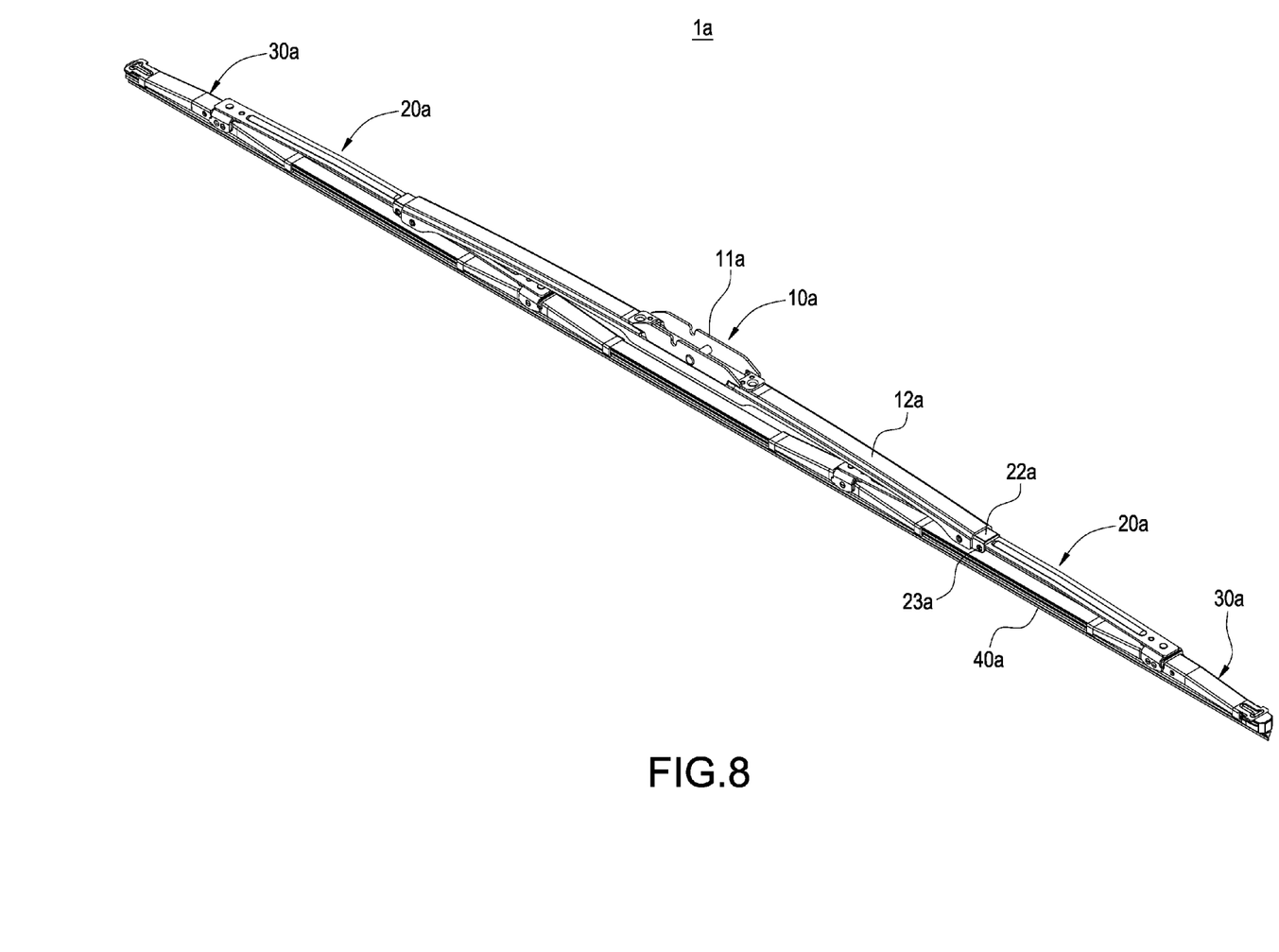
FIG. 8 is a perspective view showing the external appearance of the second embodiment of the windshield wiper of the present invention.
Figure 9:
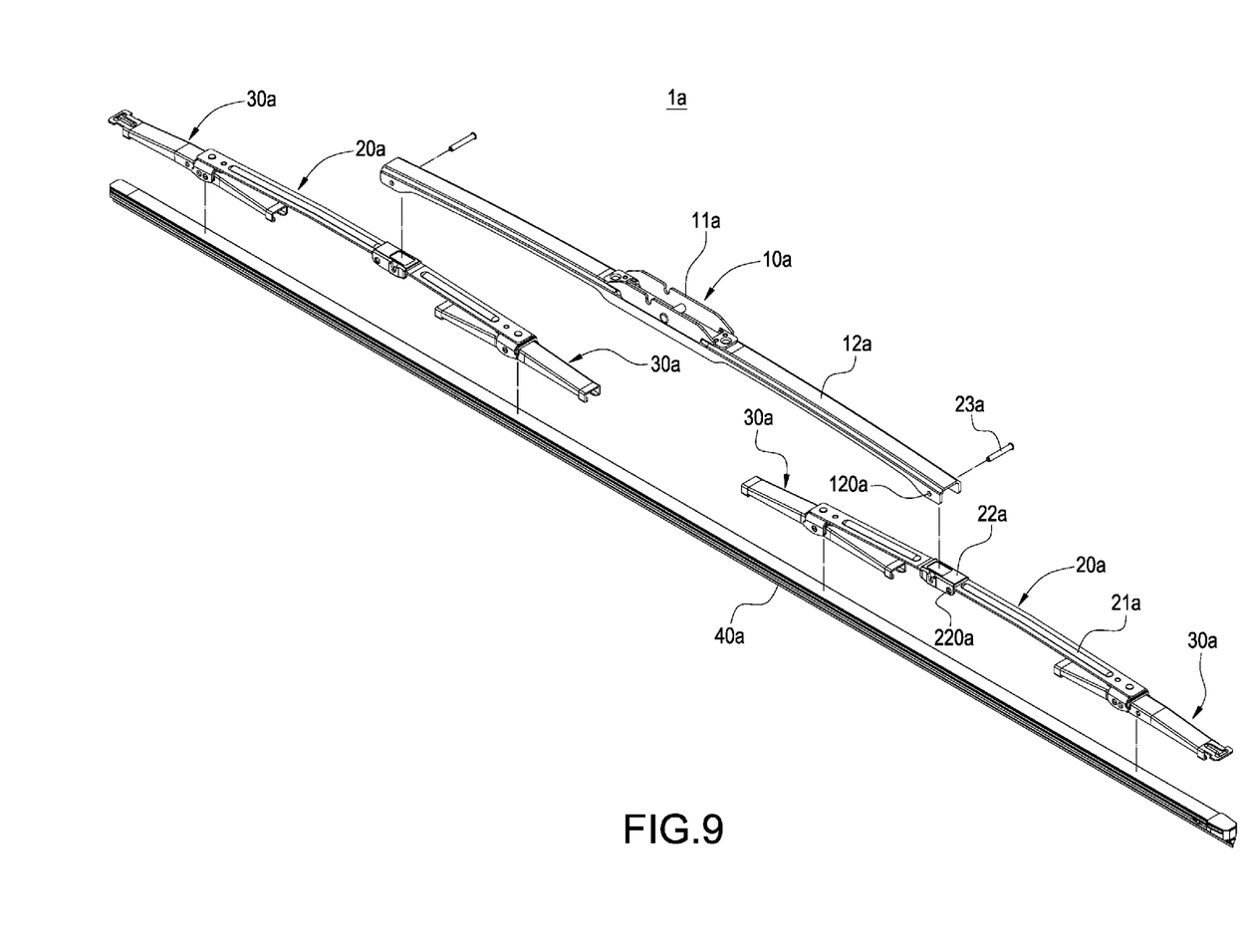
FIG. 9 is an exploded perspective view showing the windshield wiper of the second embodiment of the present invention.

Please refer to FIG. 8 and FIG. 9. FIG. 8 is a perspective view showing the external appearance of the second embodiment of the windshield wiper of the present invention, and FIG. 9 is an exploded perspective view showing the windshield wiper of the second embodiment of the present invention. In the second embodiment, a windshield wiper 1a includes a primary wiper frame 10a, a pair of auxiliary wiper frames 20a, a plurality of connecting frames 30a, and a wiper blade 40a. The primary wiper frame 10a comprises a fixing base 11a and a set of fixing arms 12a connected to both sides of the fixing base 11a. Each fixing arm 12a is provided with a first pivotal hole 120a.

The pair of auxiliary wiper frames 20a is provided on both ends of the primary wiper frame 10a, respectively. Each of the auxiliary wiper frames 20a comprises an elastic piece 21a, a pivotal base 22a fixed to the elastic piece 21a, and a set of rods 23a. The pivotal base 22a is pivotally connected to the primary wiper frame 10a. In the present embodiment, the pivotal base 22a is connected to the fixing arm 12a. In the present embodiment, the pivotal base 22a is provided with a second pivotal hole 220a corresponding to the first pivotal hole 120a. The rod 23a is disposed through the first pivotal hole 120a and the second pivotal hole 220a, thereby connecting the pair of auxiliary wiper frames 20a to the fixing arms 12a. The present embodiment is different from the first embodiment in that the pivotal base 22a is integrally formed with the elastic piece 21a, and the connecting frames 30a are evenly riveted on each auxiliary wiper frame 20a.

Figure 10:
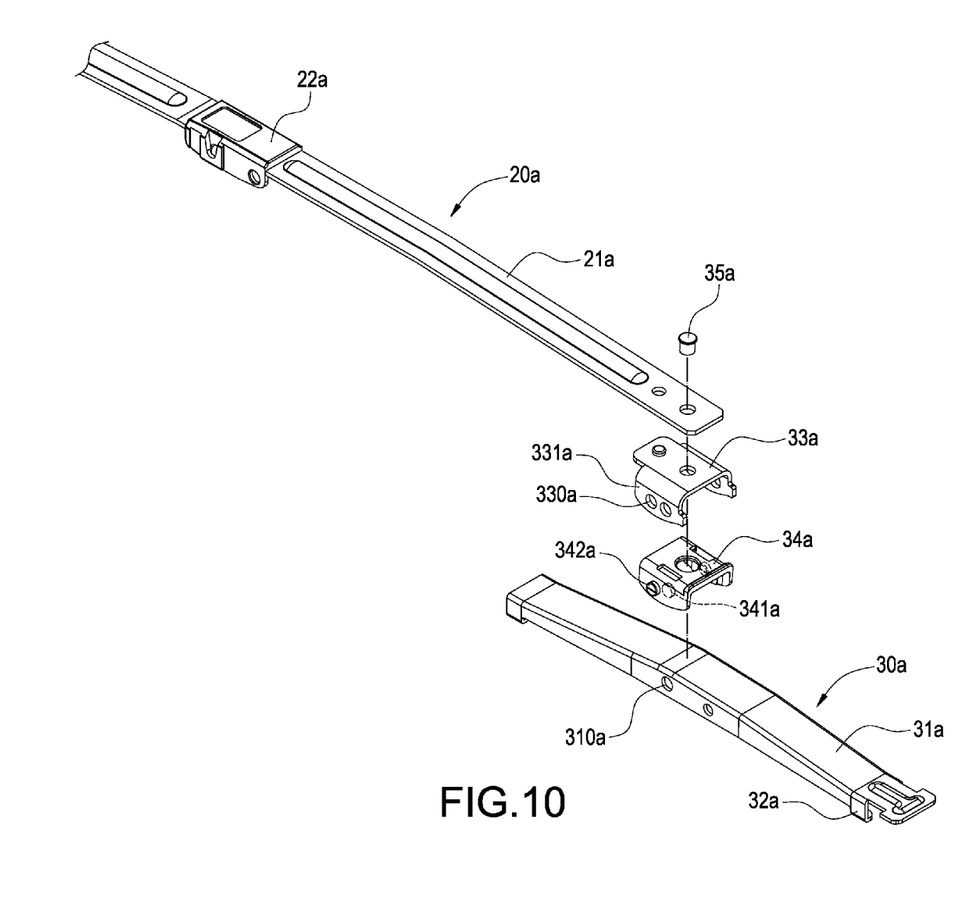
FIG. 10 is an exploded perspective view showing another embodiment of auxiliary wiper frames and another connecting frames of the present invention.
Figure 11:
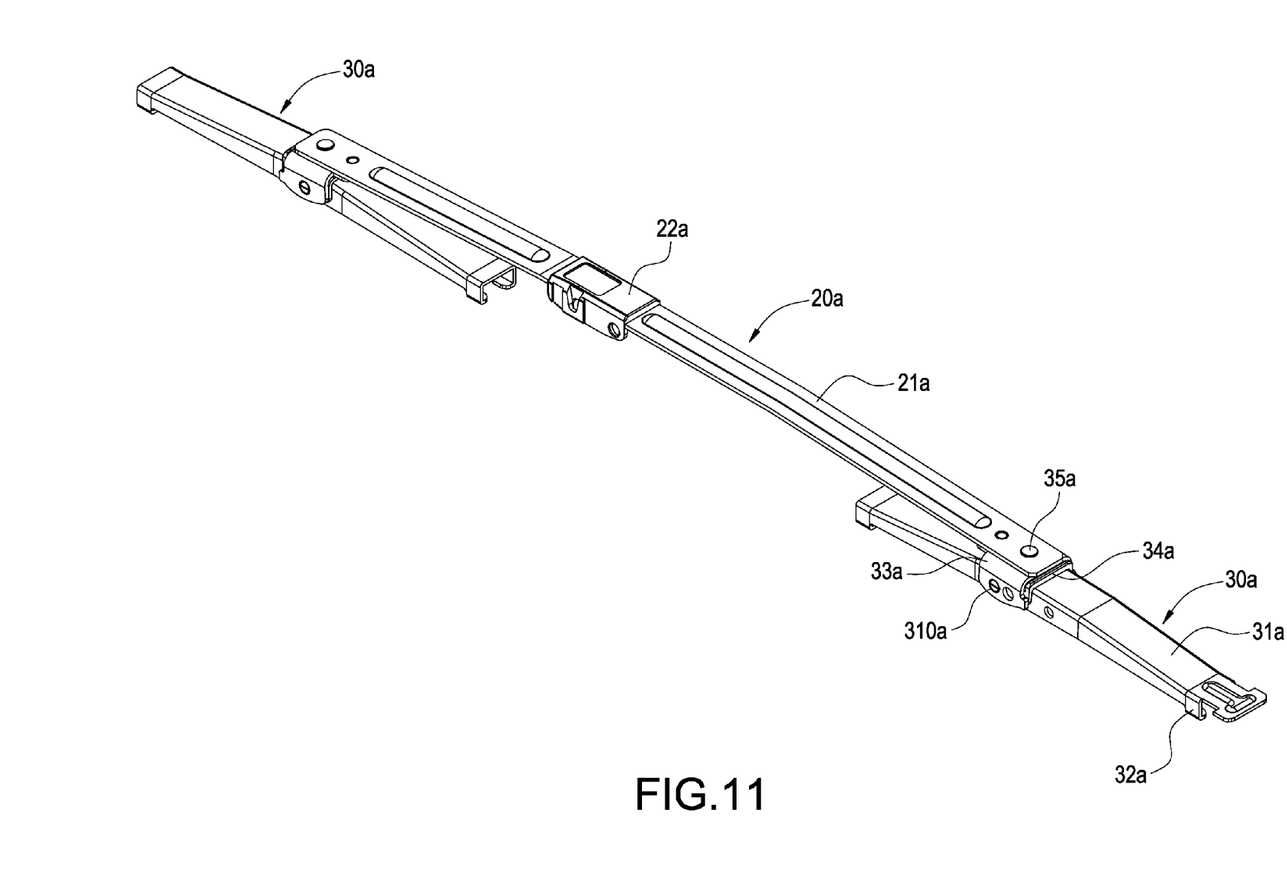
FIG. 11 is a perspective view showing the external appearance when the auxiliary wiper frames and the connecting frames of FIG. 8 of the present invention are assembled together.
Figure 12:
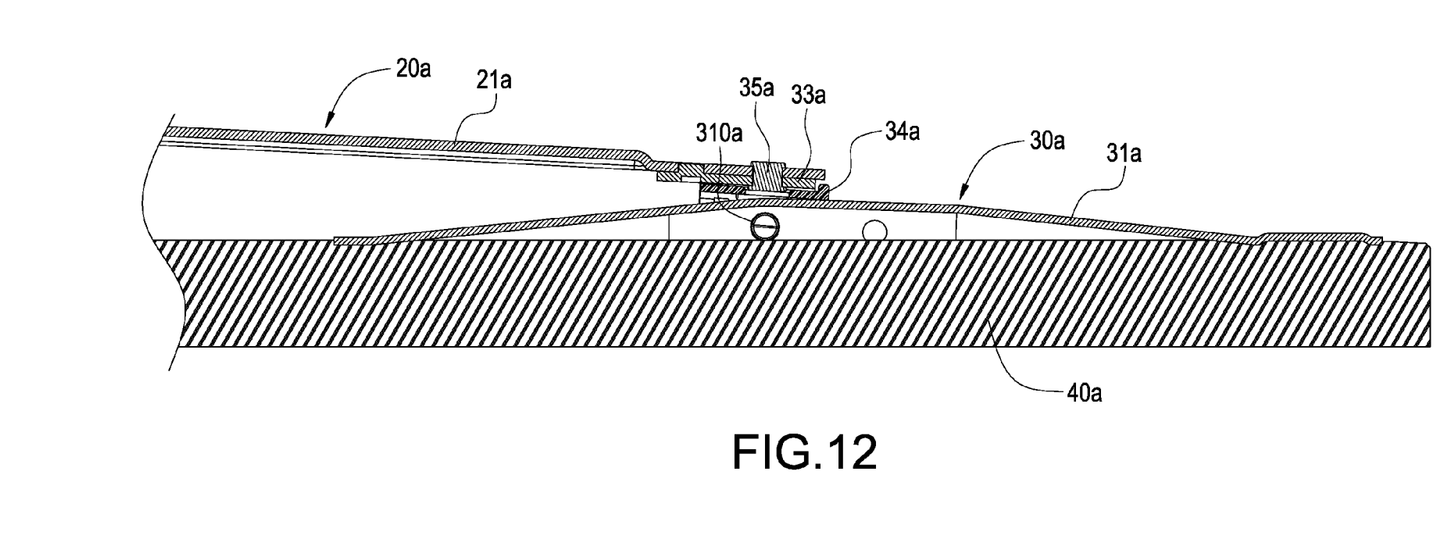
FIG. 12 is an assembled cross-sectional view showing the windshield wiper of FIG. 9 of the present invention.

Please also refer to FIGS. 10 to 12. FIG. 10 is an exploded perspective view showing the second embodiment of auxiliary wiper frames and the connecting frames of the present invention. FIG. 11 is a perspective view showing the external appearance when the auxiliary wiper frames and the connecting frames of FIG. 10 of the present invention are assembled together. FIG. 12 is an assembled cross-sectional view showing the windshield wiper of FIG. 11 of the present invention. In the present embodiment, each of the connecting frames 30a comprises a pressing piece 31a, a plurality of buckling brackets 32a provided on the pressing piece 31a, a rivet base 33a riveted to the elastic piece 31a, a rivet sheath 34a and a rivet 35a. The rivet base 33a is riveted to the elastic piece 21a through the rivet 35a. The wiper blade 40a is disposed through the buckling brackets 32a and connected below the pressing pieces 31a. The pressing piece 31a is formed into an arc shape, so that the middle portion of the pressing piece 31a is positioned at a level higher that of both sides of the pressing piece 31a. The wiper blade 40a is slidingly connected to the inside of the buckling brackets 32a.

Moreover, each of the pressing pieces 31a is provided with a positioning hole 310a, and the rivet sheath 34a is correspondingly provided with a positioning shaft 341a. The rivet sheath 34a is combined with the pressing pieces 31a through the positioning shaft 341a positioned in the positioning hole 310a. In the present embodiment, the rivet sheath 34a has a fixing protrusion 342a, and the rivet base 33a has an extended cover 331a and a fixing hole 330a provided on the extended cover 331a. Then the pressing pieces 31a will be combined to the elastic piece 21a of the auxiliary wiper frame 20a through the rivet sheath 34a connecting with the rivet base 33a. The extended cover 331a of the rivet base 33a covers the rivet sheath 34a, and the fixing protrusion 342a is located in the fixing hole 330a. Thus the rivet sheath 34a and the rivet base 33a are connected together.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A windshield wiper with an even pressing force, connected to a driving arm and including:
   a primary wiper frame comprising a fixing base connected to the driving arm;
   a pair of auxiliary wiper frames provided on both ends of the primary wiper frame, each of the auxiliary wiper frames comprising an elastic piece and a pivotal base fixed to the elastic piece, each pivotal base being pivotally connected to the primary wiper frame;
   a plurality of connecting frames evenly provided on each of the auxiliary wiper frames, each of the connecting frames comprising a pressing piece, a plurality of buckling brackets provided on each pressing piece, a rivet base riveted to each elastic piece, each rivet base is riveted to a respective one of the elastic pieces through a rivet, each pressing piece is combined to a respective one of the elastic pieces of a respective one of the auxiliary wiper frames through a rivet sheath connecting with a respective one of the rivet bases;
   a wiper blade disposed through the buckling brackets to be connected below the pressing pieces.

2. The windshield wiper with an even pressing force according to claim 1, wherein the fixing base has a pivotal shaft, and the pivotal shaft is connected to the driving arm.

3. The windshield wiper with an even pressing force according to claim 1, wherein the primary wiper frame further comprises a set of fixing arms connected to both sides of the fixing base respectively, and the pivotal bases are connected to a respective one of the fixing arms.

4. The windshield wiper with an even pressing force according to claim 3, wherein each auxiliary wiper frame further comprises a rods, and each rod is disposed through a respective one of the pivotal bases and a respective one of the fixing arms, thereby connecting the pair of auxiliary wiper frames to the fixing arms.

5. The windshield wiper with an even pressing force according to claim 4, wherein each fixing arm is provided with a first pivotal hole, each pivotal base is provided with a second pivotal hole, a respective one of the rods is disposed through the first pivotal holes and the second pivotal holes.

6. The windshield wiper with an even pressing force according to claim 1, wherein each of the pressing pieces is provided with a positioning hole, and a respective one of the rivet sheaths is correspondingly provided with a positioning shaft, and the rivet sheaths are combined with a respective one of the pressing pieces through a respective one of the positioning shafts positioned in a respective one of the positioning holes.

7. The windshield wiper with an even pressing force according to claim 1, wherein each rivet sheath has a fixing protrusion, and each rivet base has an extended cover and a fixing hole provided on the extended cover, each extended cover covers a respective one of the rivet sheaths, and a respective one of the fixing protrusions is located in a respective one of the fixing holes.

8. The windshield wiper with an even pressing force according to claim 1, wherein each pivotal base is integrally formed with a respective one of the elastic pieces.

9. The windshield wiper with an even pressing force according to claim 1, wherein each pressing piece is formed into an arc shape, and a middle portion of each pressing piece is located at a level higher than that of both sides of the pressing piece.

10. The windshield wiper with an even pressing force according to claim 1, wherein each buckling bracket comprises a U-shaped frame and a set of restricting pieces formed inside the U-shaped frame, and the wiper blade is slidingly connected to an inside of the sets of the restricting pieces.

11. The windshield wiper with an even pressing force according to claim 10, wherein the wiper blade comprises a fixing section and a wiping section connected to the fixing section, the fixing section is disposed through the U-shaped frames along the sets of restricting pieces, and the wiping section is exposed to an outside of the U-shaped frames.

\* \* \* \* \*